US010057254B2

(12) United States Patent
Kim

(10) Patent No.: US 10,057,254 B2
(45) Date of Patent: Aug. 21, 2018

(54) MOBILE TERMINAL FOR PROVIDING ONE TIME PASSWORD AND OPERATING METHOD THEREOF

(71) Applicant: Electronics and Telecommunications Research Institute, Daejeon (KR)

(72) Inventor: Young Sae Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/978,758

(22) Filed: Dec. 22, 2015

(65) Prior Publication Data

US 2016/0191504 A1    Jun. 30, 2016

(30) Foreign Application Priority Data

Dec. 31, 2014  (KR) ......................... 10-2014-0194799

(51) Int. Cl.
*H04L 29/06*  (2006.01)
*H04W 12/06*  (2009.01)
*H04W 12/04*  (2009.01)

(52) U.S. Cl.
CPC ......... *H04L 63/0838* (2013.01); *H04W 12/04* (2013.01); *H04W 12/06* (2013.01); *H04L 63/0853* (2013.01)

(58) Field of Classification Search
CPC .... H04L 63/0838; H04W 12/04; H04W 12/06
USPC ......................................................... 726/6, 9
See application file for complete search history.

(56) References Cited

U.S. PATENT DOCUMENTS

| 8,234,492 | B2  |   | 7/2012  | Kim et al.            |
|-----------|-----|---|---------|-----------------------|
| 9,331,852 | B2  | * | 5/2016  | Gupta .......... H04L 9/0869 |
| 9,779,232 | B1  | * | 10/2017 | Paczkowski ...... G06F 21/45 |
| 2007/0130472 | A1 | * | 6/2007 | Buer ............ H04L 63/0428 |
|           |     |   |         | 713/182               |

(Continued)

FOREIGN PATENT DOCUMENTS

| KR | 10-1092186 B1 | 12/2011 |
| KR | 10-1479318 B1 | 1/2015  |

OTHER PUBLICATIONS

The Mobile Phone as a Multi OTP Device Using Trusted Computing, 10.1109/NSS.2010.39, Alzomai et al, (Year: 2010).*

(Continued)

*Primary Examiner* — Jahangir Kabir
(74) *Attorney, Agent, or Firm* — Nelson Mullins Riley & Scarborough LLP; Anthony A. Laurentano

(57) ABSTRACT

Provided are a mobile terminal for providing a one-time password (OTP) and an operation method thereof. The mobile terminal includes a first one-time password (OTP) generating module configured to provide identification information regarding each of a plurality of pieces of OTP data to a user, and output an OTP provided according to any one identification information selected by the user, and a second OTP generating module based on mobile trusted module (MTM) configured to transfer the identification information regarding each of the plurality of pieces of OTP data to the first OTP generating module according to a corresponding request from the first OTP generating module, generate an OTP by using OTP data corresponding to the selected identification information, and transfer the generated OTP to the first OTP generating module.

11 Claims, 5 Drawing Sheets

(56) References Cited

U.S. PATENT DOCUMENTS

2009/0158033 A1 6/2009 Jeong et al.
2009/0316903 A1 12/2009 Jeung
2015/0169860 A1* 6/2015 Kim ..................... G06F 21/34
　　　　　　　　　　　　　　　　　　　　　726/9

OTHER PUBLICATIONS

DFCloud: A TPM-based secure data access control method of cloud storage in mobile devices, 10.1109/CloudCom.2012.6427606, (Year: 2012).*

* cited by examiner

MOBILE TERMINAL FOR PROVIDING ONE TIME PASSWORD AND OPERATING METHOD THEREOF

CROSS-REFERENCE TO RELATED APPLICATIONS

This application claims priority under 35 U.S.C. § 119 to Korean Patent Application No. 10-2014-0194799, filed on Dec. 31, 2014, the disclosure of which is incorporated herein by reference in its entirety.

TECHNICAL FIELD

The present invention relates to a mobile terminal for providing a one time password (OTP), and more particularly, to a technique of enhancing safety of OTP generation in a mobile terminal.

BACKGROUND

In general, a user authentication scheme based on an ID/password is most commonly used but vulnerable to attacker's hacking, having a problem of security. As a solution to security vulnerability, recently a one time password (OTP) technique has been widely used.

The OTP technique strengthens security through an OTP that may replace an existing fixed password. The OTP scheme is mainly used as a secondary user authentication unit in addition to the existing ID/password scheme. For example, the OTP scheme tends to be settled as a means for strengthening security in online/mobile banking for financial transaction or online games requiring payment.

In the OTP scheme, a new password is generated each time a user is to be authenticated, and once a password is used, the used password cannot be used again. Also, a uni-directional hash function is used as an algorithm for generating an OTP, making it impossible to infer a password, providing powerful security. That is, according to the OTP scheme, a user is authenticated by determining whether OTP values respectively generated by the user and an authentication server are identical, a used OTP is not reused, and it is impossible to infer a password, thus ensuring safe user authentication.

Such an OTP generation function is implemented through various schemes such as a time synchronization scheme, an event scheme, and a question and answer scheme. These schemes are classified according to how an OTP generating device and an authentication server periodically obtain the same input value and generate the same OTP on both sides. These days, the time synchronization scheme in which an OTP is automatically generated at every predetermined time or methods based on the time synchronization scheme are commonly used.

In order to use the OTP scheme, a separate OTP authentication server may be established on an authentication server side or an OTP authentication module may be added to an existing authentication server. Also, a user requires a device for generating an OTP. OTP generating devices on the user side may be divided into two types.

A first type is an OTP generating device which may be a hardware-based OTP token or OTP card which has been widely used in an existing banking area (which has also been initially used in some game companies). A user may carry such an OTP generating device, and when the user wants to use the OTP generating device for a banking transaction, or the like, the user may input an OTP generated by and displayed on the OTP generating device to another device (e.g., a personal computer (PC) or a mobile terminal) for executing the banking transaction, as is.

A second type is a mobile OTP generating device in which an OTP is implemented by software in a mobile terminal such as a smartphone which is widely used, or the like. The use of the mobile OTP generating device tends to be expanded largely in games or Internet portal sites. The mobile OTP scheme using the mobile OTP generating device is advantageous in that, without having to carry a separate OTP device, a user may generate a mobile OTP in a mobile terminal that he or she carries, output a value (mobile OTP) on a screen of the mobile terminal, and use the output value as a value to be input when the user wants to access a PC-based portal site or a game.

However, it is impossible to use the mobile OTP scheme using a mobile terminal for the purpose of banking transactions domestically due to a problem of security. The reason is because the current mobile OTP scheme fundamentally has the following security problems.

First, there is a possibility in which important information related to generation of a mobile OTP is hacked by an external attack. The mobile OTP generating device exists as an application program (application or App) implemented by software in a mobile terminal. Here, if malicious codes aimed at obtaining user data without authorization are installed in the mobile terminal due to security vulnerability thereof, there is a possibility in which important data such as a seed required for generating a mobile OTP and user-specific information is leaked.

Also, there is a possibility of hacking based on forgery and falsification of an application for generating a mobile OTP. Currently, an application installed in mobile terminals constantly involves a possibility of hacking based on forgery and falsification. Without knowledge of the fact that an application for generating a mobile OTP has been forged or falsified, or disregarding the fact, if a user drives the application to generate a mobile OTP, important information of the user may be transmitted to an external attacker, namely, hacked.

SUMMARY

Accordingly, the present invention provides a technical scheme for generating a one-time password (OTP) in a mobile terminal, such as a smartphone, more safely than generating an OTP by software in the mobile terminal.

In one general aspect, a mobile terminal includes: a first one-time password (OTP) generating module configured to provide identification information regarding each of a plurality of pieces of OTP data to a user, and output an OTP provided according to any one identification information selected by the user; and a second OTP generating module based on mobile trusted module (MTM) configured to transfer the identification information regarding each of the plurality of pieces of OTP data to the first OTP generating module according to a corresponding request from the first OTP generating module, generate an OTP by using OTP data corresponding to the selected identification information, and transfer the generated OTP to the first OTP generating module.

The first OTP generating module and the second OTP generating module may be independently configured on the basis of separate hardware.

The first OTP generating module may include: an OTP information providing unit configured to request a plurality of pieces of OTP data retained in the mobile terminal from the second OTP generating module, and provide identification information regarding each of the plurality of pieces of OTP data received from the second OTP generating module; an OTP generation data transmitting unit configured to transmit the selected identification information and an input parameter for OTP generation to the second OTP generating module; and an OTP output unit configured to receive the OTP generated by the second OTP generating module and output the received OTP.

The second OTP generating module may include: an OTP calculating unit configured to perform a calculation operation to generate an OTP; an OTP storage unit configured to store a plurality of pieces of OTP data and identification information regarding each of the plurality of pieces of OTP data; and an OTP control unit configured to control the OTP calculating unit to perform calculation by using a specific cryptographic engine on the basis of the selected identification information received from the first OTP generating module.

The OTP calculating unit may include a plurality of cryptographic engines for processing a plurality of cipher algorithms, and perform a calculation operation to generate the OTP by using the specific cryptographic engine according to the selected identification information.

The OTP calculating unit may perform a calculation operation to generate the OTP by using the input parameter received from the first OTP generating module and OTP data corresponding to the specific identification information.

The second OTP generating module may be configured within an MTM.

Each of the plurality of pieces of OTP data may be seed information used as a basic input value for generating an OTP and user-specific information, and may be registered as the same value in an authentication server from which authentication is to be requested using an OTP, in advance.

The identification information may include identifiable information with respect to the plurality of pieces of OTP data, may be stored together with the OTP data, and may include at least one of application information, ID information, and information regarding a used cryptographic engine.

In another general aspect, a method for generating a one-time password (OTP) by a first OTP generating module of a mobile terminal, includes: providing identification information regarding each of a plurality of pieces of OTP data to a user; transmitting any one identification information selected by the user and time information to a second OTP generating module based on mobile trusted module (MTM); and receiving an OTP generated by the second OTP generating module according to the selected identification information and outputting the received OTP.

The second OTP generating module may be independently configured on the basis of hardware separately from the first OTP generating module.

The providing may include: requesting the plurality of pieces of OTP data from the second OTP generating module; and receiving identification information regarding each of the plurality of pieces of OTP data from the second OTP generating module in response to the request, and providing the received identification information to the user.

Each of the plurality of pieces of OTP data may be seed information used as a basic input value for generating an OTP and user-specific information, and may be registered as the same value in an authentication server from which authentication is to be requested using an OTP, in advance.

The identification information may include identifiable information with respect to the plurality of pieces of OTP data, may be stored together with the OTP data, and may include at least one of application information, ID information, and information regarding a used cryptographic engine.

In another general aspect, a method for generating a one-time password (OTP) by a second OTP generating module of a mobile terminal, includes: transmitting identification information regarding each of a plurality of pieces of OTP data to a first OTP generating module; receiving identification information selected by a user and time information from the first OTP generating module; performing calculation to generate an OTP by using OTP data corresponding to the selected identification information and the time information; and providing an OTP generated according to the calculation result to the user through the first OTP generating module.

The transmitting may include: receiving a request for transmission of a plurality of pieces of OTP data retained in the mobile terminal from the first OTP generating module; and transmitting identification information corresponding to each of the plurality of pieces of OTP data to the first OTP generating module.

The calculating may include: performing a calculation operation for generating the OTP by using a specific cryptographic engine according to the selected identification information among a plurality of cryptographic engines for providing a plurality of cipher algorithms.

Each of the plurality of pieces of OTP data may be seed information used as a basic input value for generating an OTP and user-specific information, and may be registered as the same value in an authentication server from which authentication is to be requested using an OTP, in advance.

The identification information may include identifiable information with respect to the plurality of pieces of OTP data, may be stored together with the OTP data, and may include at least one of application information, ID information, and information regarding a used cryptographic engine.

The first OTP generating module and the second OTP generating module may be independently provided on the basis of hardware separately.

Other features and aspects will be apparent from the following detailed description, the drawings, and the claims.

DETAILED DESCRIPTION OF EMBODIMENTS

Figure 1:
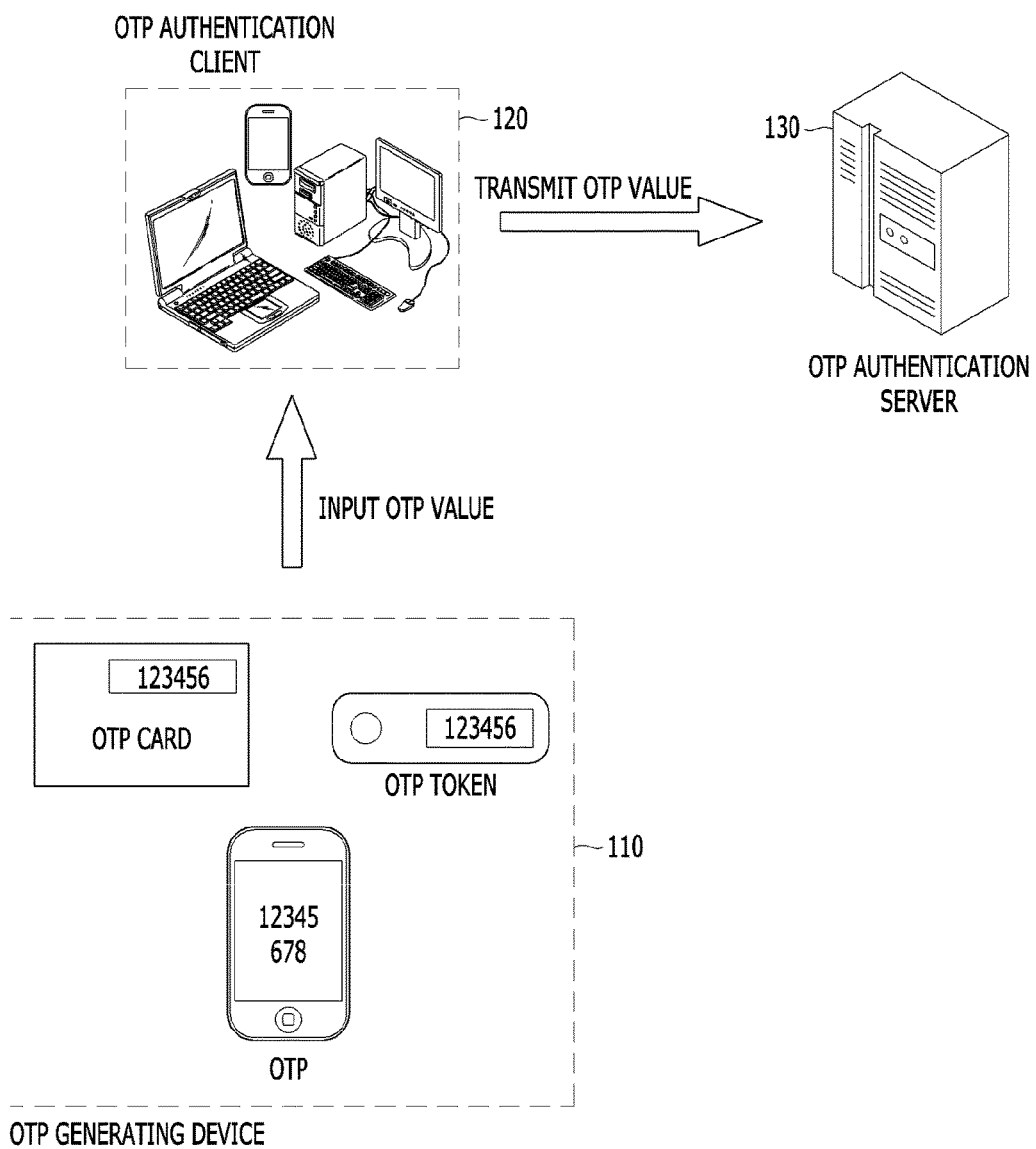
FIG. 1 is a view illustrating a configuration of a system in which a mobile terminal for providing a one-time password (OTP) operates according to an embodiment of the present invention.

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terms used herein are for the purpose of describing particular embodiments only and are not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments of the present invention will be described in detail with reference to the accompanying drawings. In adding reference numerals for elements in each figure, it should be noted that like reference numerals already used to denote like elements in other figures are used for elements wherever possible. Moreover, detailed descriptions related to well-known functions or configurations will be ruled out in order not to unnecessarily obscure subject matters of the present invention.

FIG. 1 is a view illustrating a configuration of a system in which a mobile terminal for providing a one-time password (OTP) operates according to an embodiment of the present invention.

In general, an OTP generating device 110 such as an OTP card, an OTP token, or an OTP terminal generates an OTP (first OTP) by applying the same OTP scheme as that of an OTP authentication server 130. A user inputs the OTP (first OTP) generated by the OTP generating unit 110 to a certain OTP authentication client 120 requesting OTP authentication. When the input OTP (first OTP) and an OTP (second OTP) generated by the OTP authentication server 130 authenticating the user are identical, authentication is successful, or otherwise, authentication fails.

Here, OTP refers to a one-time password generated through the OTP generating device 110 (in particular, an OTP generating device implemented by software in a mobile terminal).

The OTP authentication client 120 refers to a device including an OTP authentication processor requesting the user to input the OTP (first OTP) in a state in which a Web or other program is executed. For example, the OTP authentication client 120 may include a mobile terminal such as a smartphone, or a personal computer (PC). The OTP authentication client 120 transmits the input OTP (first OTP) to the OTP authentication server 130 and requests user authentication.

Also, the OTP authentication server 130 refers to a server device performing user authentication by comparing the OTP (first OTP) transmitted from the OTP authentication client 120 with the OTP (second OTP) generated by the OTP authentication server 130 with respect to a corresponding registered user. Here, when the first OTP and the second OTP are identical, it means that authentication is successfully performed.

An existing OTP generating device is implemented in the form of generating only one OTP corresponding to a specific application. In contrast, a mobile terminal providing an OTP according to an embodiment of the present invention generates an OTP requested by a plurality of applications, alone. Also, the mobile terminal providing an OTP according to an embodiment of the present invention may manage a plurality of pieces of data for OTP (or a plurality of pieces of OTP data) with respect to one application, and generate a corresponding OTP.

In order to provide a safer mobile communication environment, a mobile terminal equipped with a hardware-based security module has been studied. In this connection, development of a mobile terminal equipped with a mobile trusted module (MTM) has also been made. The MTM basically provides safety of a mobile terminal through functions of terminal (device) authentication, guaranteeing terminal integrity, and vulnerable data protection. By hardware, the MTM may be an embedded system aiming at security providing a cryptographic engine, a safe memory, and a tamperproof function on the basis of low power consumption and highly efficient processor.

Figure 2:
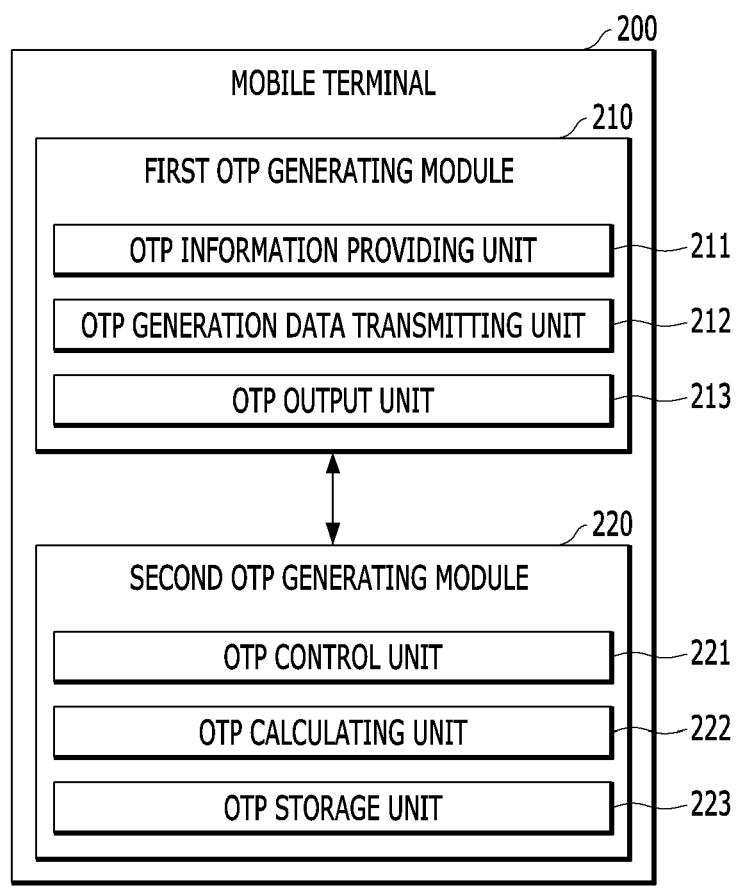
FIG. 2 is a block diagram illustrating an overall configuration of a mobile terminal for providing an OTP according to an embodiment of the present invention.

To this end, the mobile terminal for providing an OTP according to an embodiment of the present invention is implemented to have a configuration as illustrated in FIG. 2. As illustrated in FIG. 2, a first OTP generating module 210 and a second OTP generating module 220 are implemented in a mobile terminal 200 for providing an OTP according to an embodiment of the present invention.

Here, the mobile terminal 200 refers to a mobile terminal allowing the first OTP generating module 210 to be installed therein and including an MTM to provide the hardware-based second OTP generating module (MTM-based OTP generating module) 220.

Here, the MTM is security hardware installed to strengthen security of the mobile terminal 200. The MTM may provide an integrity verification function with respect to the first OTP generating module 210, and the second OTP generating module 220 may be installed through a resource and a hardware function of the MTM.

The OTP generating module 210 includes an OTP information providing unit 211, an OTP generation data transmitting unit 212, and an OTP output unit 213.

The first OTP generating module 210 requires the second OTP generating module 220 as a key module for generating an OTP for user authentication. Here, the second OTP generating module 220 is independently configured separately on the basis of hardware within the MTM included in the mobile terminal 200, rather than being configured on the basis of software together with the first OTP generating module 210.

The second OTP generating module 220 includes an OTP storage unit 221 storing important data such as seed information required for generating an OTP and user-specific information, an OTP calculating unit 222 performing calculation required for generating an OTP, and an OTP control unit 223 controlling an overall operation of the second OTP generating module 220 by interworking with the first OTP generating module 210.

Figure 3:
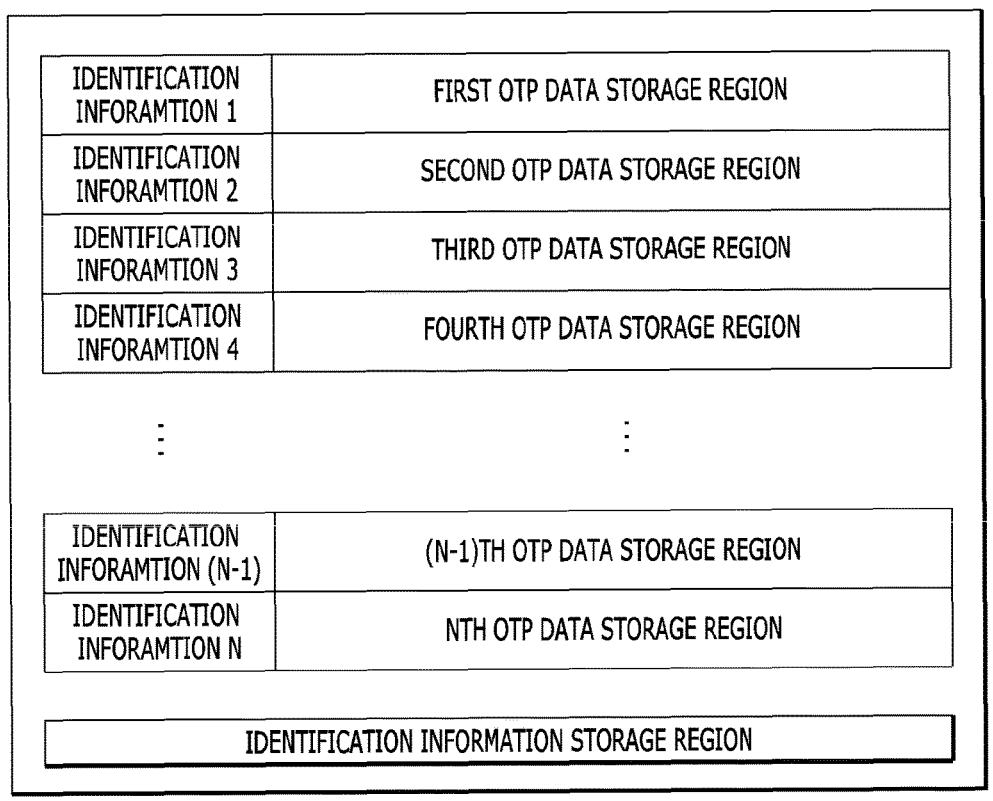
FIG. 3 is a view illustrating storing and managing OTP data and identification information according to an embodiment of the present invention.

Hereinafter, an operation of the mobile terminal for generating and providing an OTP will be described in detail with reference to FIGS. 2 and 3.

When the user drives the system for generating an OTP, the first OTP generating module 210 implemented in the mobile terminal 200 requests a plurality of pieces of OTP data or identification information of the plurality of pieces of OTP data retained in the mobile terminal from the second OTP generating module 220. This is to allow the first OTP generating module 210 to generate an OTP for an input of OTP data corresponding to identification information selected by the user, during an OTP generation process.

Here, the OTP data refers to seed information used as a basic input value for generating an OTP and user-specific information, and here, it is assumed that the same value has been registered in the authentication server from which authentication is to be requested, through an OTP issuance process of the first OTP generating module 210.

Also, the identification information may be information stored together for management of the OTP data, which includes information for identifying each OTP data. For example, the identification information refers to identification information regarding each data such as ID information such as a serial number or an allocated name and used cryptographic engine information when there is application information and a plurality of pieces of OTP data regarding an application. Also, the identification information refers to information identifying important data such as to which application corresponding OTP data is related, which data it is.

In this manner, the OTP information providing unit 211 of the first OTP generating module 210 requests the second OTP generating module 220 to send information regarding currently stored OTP data (information related to OTP data).

Upon receiving the request, the OTP control unit 223 of the second OTP generating module 220 provides only identification information of each of the plurality of pieces of OTP data for security, rather than handing over the OTP data as is. That is, the OTP control unit 223 transmits only identification information of important data for generating OTP stored in the OTP storage unit 221, to the first OTP generating module 210.

In this manner, in order to strengthen security by managing OTP data only within the second OTP generating module 220, the OTP storage unit of the second OTP module 220 stores the identification information together when storing the OTP data, and manages them. For example, the OTP storage unit 221 stores and manages OTP data and identification information in a manner such as illustrated in FIG. 3.

For example, when the number of OTP data that can be stored is N, N number of storage regions of the OTP data may have individual identification information value with respect to each data, and the individual identification information values are searched by the OTP control unit 223.

In another example, when the number of pieces of OTP data capable of being stored is N, identification information values are not stored together with the OTP data but a separate storage region is provided for identification information regarding the entire N number of stored OTP data, and managed therein. Thus, the OTP control unit 223 may access only the region as necessary.

Meanwhile, when the first OTP generating module 210 receives identification information from the second OTP generating module 220, the first OTP generating module 210 provides identification information of the plurality of pieces of OTP data to the user through the OTP information providing unit 211. Here, the OTP information providing unit 211 displays the identification information in such a form that it can be recognized by the user.

The user may generate an OTP by selecting desired identification information among the plurality of pieces of identification information provided through the OTP information providing unit 211.

When OTP generation starts as the user selects specific information (identification information), the first OTP generating module 210 transmits an input parameter required for generating an OTP and the selected identification information to the second OTP generating module 220 through the OTP generation data transmitting unit 212.

Here, a general hardware OTP generating device has a battery and is provided with power therefrom, it obtains time information through a real-time timer operated when a time synchronization-based OTP is generated. In contrast, the first OTP generating module 210 is provided with time information from the mobile terminal 200, as an input parameter when the time synchronization-based OTP is generated.

After the afore-mentioned process, the second OTP generating module reads OTP data corresponding to the identification information selected by the user from the OTP storage unit 221. Also, the OTP control unit 223 instructs the OTP calculating unit 222 to generate an OTP by using the input parameter (time information) and the read OTP data. Here, the OTP calculating unit 222 may have a plurality of cryptographic engines to process a plurality of cipher algorithms, and includes information related thereto within the identification information. Also, the OTP control unit 223 may instruct the OTP calculating unit 222 to use a specific cryptographic engine according to identification information.

When an OTP is generated through the calculation operation of the OTP calculating unit 222, the OTP control unit 223 finally transmits the generated OTP to the first OTP generating module 210. The first OTP generating module 210 outputs the OTP received from the second OTP generating module through the OTP output unit 213 in such a form that the OTP may be recognized by the user.

In this manner, according to an embodiment of the present invention, calculation and processing of important data, the essential part for generating an OTP, are performed in the separate hardware region completely independent from the first OTP generating module executed by software in the mobile terminal. Thus, a problem in which important data is exposed to a malicious code, or the like, that may be generated during an OTP generating process, can be solved, and thus, an OTP may be more safely generated, providing an advantage in terms of security.

In addition, by utilizing the MTM as the independent, separate hardware region, integrity of the first OTP generating module can be guaranteed through the MTM, advantageously blocking an attempt to perform hacking based on forgery or falsification of the first OTP generating module in advance.

Also, in terms of data protection through independent hardware, stronger security may be provided by utilizing the MTM, hardware applied for security of the mobile terminal, and since an OTP is implemented by using computing power, the cryptographic engine, and the hardware resource of the MTM, it is advantageous in terms of using resource of the mobile terminal.

In terms of user, an OTP is supported through a single mobile terminal, without having to install a separate first OTP generating module in every application requesting OTP generation.

Figure 4:
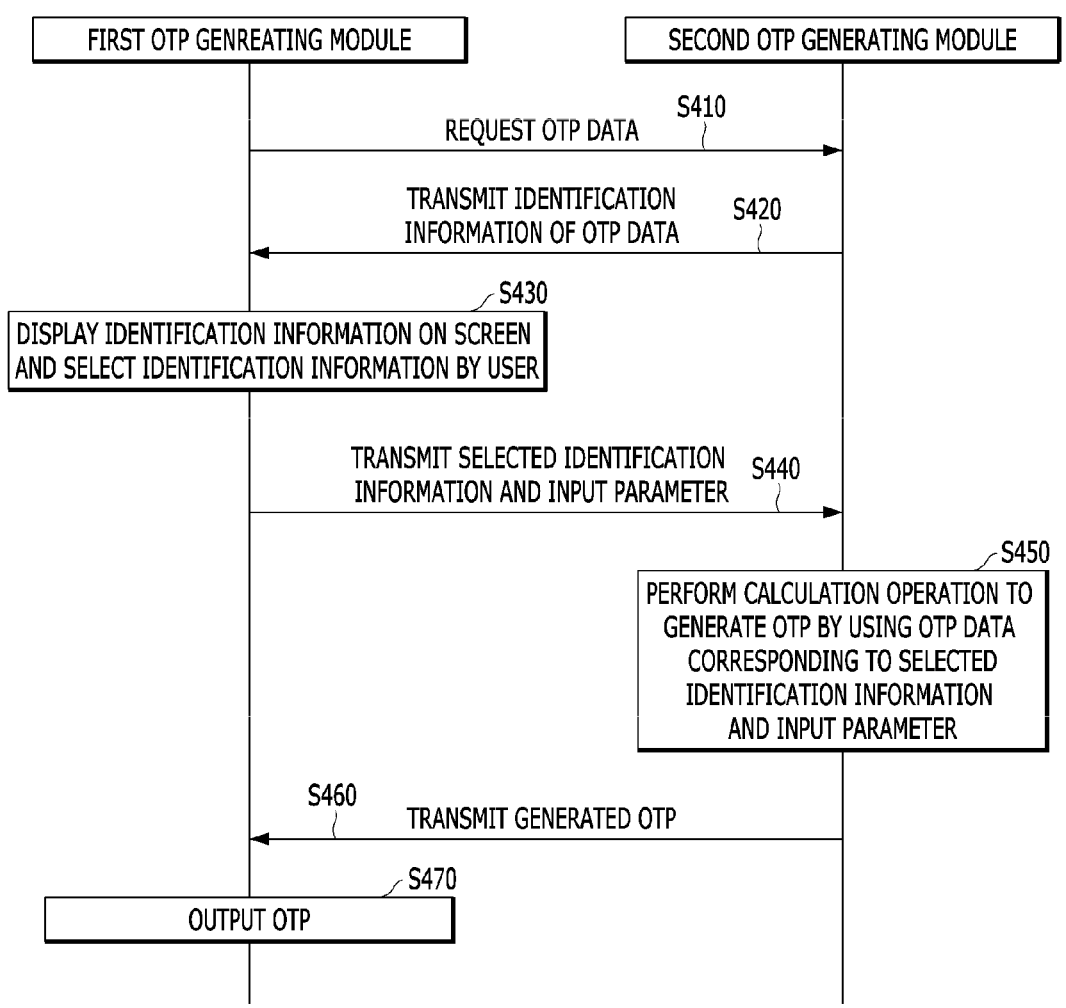
FIG. 4 is a flow chart illustrating an operation of generating an OTP by a first OTP generating module and a second OTP generating module implemented in a mobile terminal according to an embodiment of the present invention.

Hereinafter, an operation of generating an OTP by the first OTP generating module 210 and the second OTP generating module 220 implemented in the mobile terminal 200 according to an embodiment of the present invention will be described with reference to FIG. 4.

Before performing an OTP generation operation, the mobile terminal 200 performs an important operation, that is, determining an integrity state of the first OTP generating module 210.

The mobile terminal 200 determines whether integrity of the first OTP generating module 210, which is to be currently executed by the MTM equipped with the second OTP generating module 220, is maintained without being forged or falsified. Basically, the MTM provides a function of verifying both system integrity and application integrity, and the MTM according to an exemplary embodiment of the present invention additionally performs an integrity verification operation on the first OTP generating module 210, providing more powerful security function.

If it is determined that the integrity of the first OTP generating module 210 is damaged, the mobile terminal 200 terminates the first OTP generating module 210, without driving it. Thereafter, an operation of the mobile terminal 200 is performed according to a policy prescribed between the MTM and the mobile terminal 200.

When integrity of the OTP generating module 210 is confirmed, the first OTP generating module 210 requests identification information of OTP data in step S410.

When the user drives the system for generating an OTP, the first OTP generating module 210 installed in the mobile terminal 200 requests the second OTP generating module 220 to send information regarding the plurality of pieces of OTP data retained therein.

In response to the request, the second OTP generating module 220 transmits identification information corresponding to the OTP data present in the mobile terminal 200 to the first OTP generating module 210. Here, the second OTP generating module 220 provides only the identification information of each OTP data, rather than handing over the OTP data as is. The second OTP generating module 220 reads the identification information corresponding to the OTP data from a separate memory, and transmits the read identification information to the first OTP generating module 210.

The first OTP generating module 210 displays the plurality of pieces of received identification information of the OTP data on a screen, and the user selects identification information in step S430.

Here, in response to the request in step S410, the first OTP generating module 210 displays the plurality of pieces of identification information received from the second OTP generating module 220 on the screen for user recognition. Here, the first OTP generating module 210 provides and displays the identification information in such a form that can be recognized by the user. The user selects any one of the plurality of pieces of identification information displayed on the screen.

The first OTP generating module 210 transmits an input parameter required for generating an OTP and the identification information selected by the user to the second OTP generating module 220 in step S440.

For example, when any one of the plurality of pieces of identification information is selected by the user, the first OTP generating module 210 obtains time information as an input parameter. Accordingly, the first OTP generating module 210 transmits the time information together with the identification information selected by the user to the second OTP generating module 220.

The second OTP generating module 220 performs a calculation operation to generate an OTP on the basis of the received input parameter and the selected identification information in step S450.

The second OTP generating module reads OTP data corresponding to the identification information received from the first OTP generating module 210, from the memory. Here, the memory has the OTP data and identification information corresponding thereto stored and managed therein. Thus, the second OTP generating module 220 may read the OTP data corresponding to the identification information received from the first OTP generating module 210, from the memory.

The second OTP generating module 220 has a plurality of cryptographic engines to process a plurality of cipher algorithms, and performs a calculation operation for generating an OTP by using a specific cryptographic engine according to the identification information of OTP data.

The second OTP generating module 220 transmits an OTP generated through the calculation to the first OTP generating module 210 in step S460.

The first OTP generating module 210 outputs the OTP generated by the second OTP generating module 220 in step S470. Here, the first OTP generating module outputs the OTP received from the second OTP generating module 220 in such a form that can be recognized by the user.

In this manner, according to embodiments of the present invention, calculation as a key operation for generating an OTP and processing of important data are performed in the separate hardware region completely independent from the first OTP generating module executed by software in the mobile terminal. Thus, a problem in which important data is exposed to a malicious code that can be generated during an OTP generating process, may be solved, and thus, an OTP may be more safely generated, enhancing an advantage in terms of security.

In addition, since the MTM is utilized as the separate independent hardware region, integrity of the first OTP generating module may be guaranteed through the MTM, whereby an attempt to hack the first OTP generating module through forge and falsification may be prevented in advance. Also, in terms of data protection through independent hardware, stronger security may be provided by utilizing the MTM as hardware applied for security of the mobile terminal, and since an OTP is implemented by using computing power, the cryptographic engine, and hardware resource of the MTM , the resource of the mobile terminal may be advantageously used.

In terms of user, an OTP may be supported through a single mobile terminal without the necessity of installing a separate OTP generating device for every application requesting OTP generation.

According to embodiments of the present invention, since the MTM-based hardware type OTP generating method, rather than the existing simple application-based software type OTP generating method, is applied, vulnerability of security of the mobile terminal due to a malicious code in generating an OTP may be resolved and OTP hacking by a forged or falsified mobile terminal may be prevented.

Figure 5:
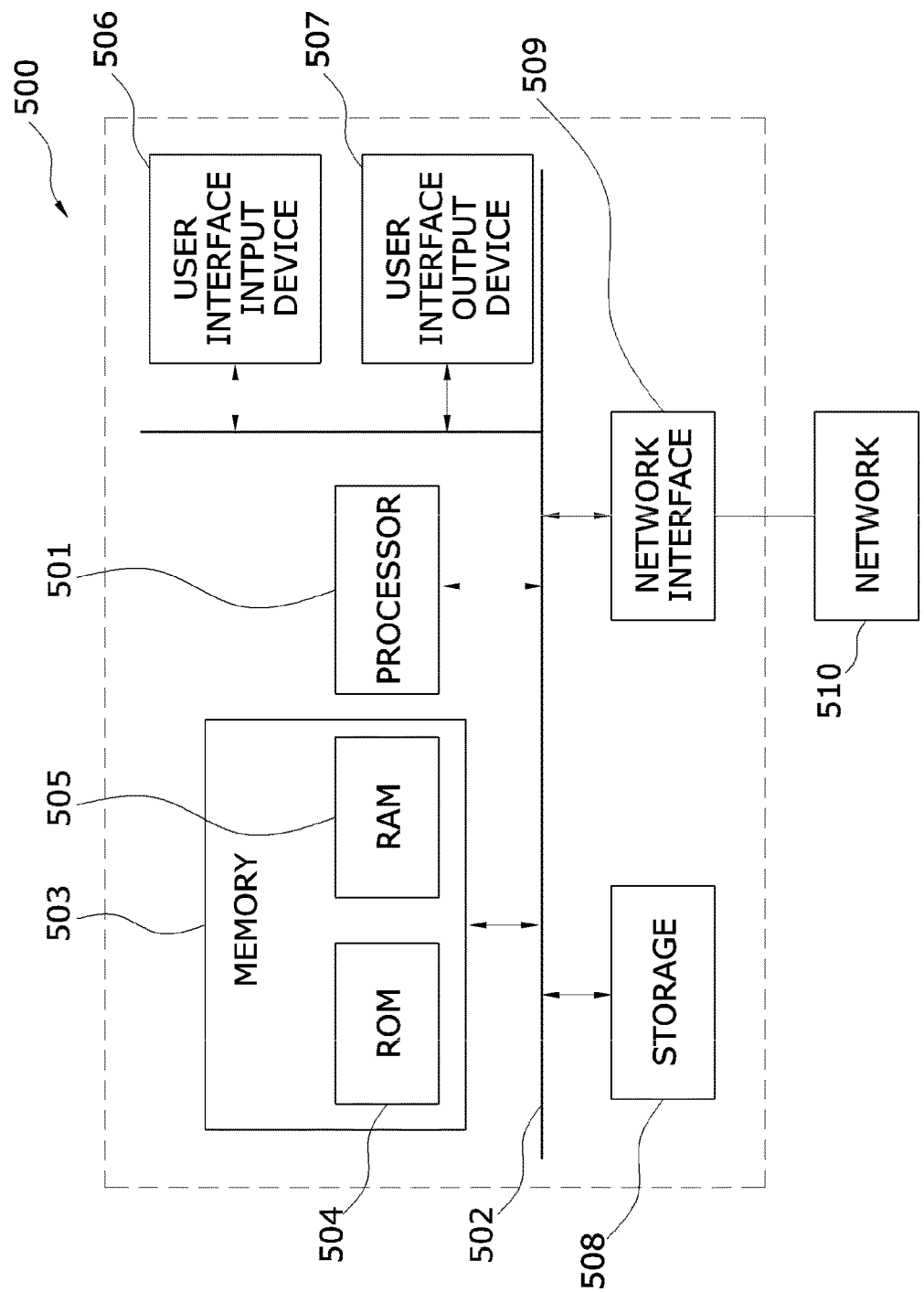
FIG. 5 is a block diagram illustrating a computer system for the present invention.

An embodiment of the present invention may be implemented in a computer system, e.g., as a computer readable medium. As shown in in FIG. 5, a computer system 500 may include one or more of a processor 501, a memory 503, a user input device 506, a user output device 507, and a storage 508, each of which communicates through a bus 502. The computer system 500 may also include a network interface 509 that is coupled to a network 510. The processor 501 may be a central processing unit (CPU) or a semiconductor device that executes processing instructions stored in the memory 503 and/or the storage 508. The memory 503 and the storage 508 may include various forms of volatile or non-volatile storage media. For example, the memory may include a read-only memory (ROM) 504 and a random access memory (RAM) 505.

Accordingly, an embodiment of the invention may be implemented as a computer implemented method or as a non-transitory computer readable medium with computer executable instructions stored thereon. In an embodiment, when executed by the processor, the computer readable instructions A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A mobile terminal comprising:
    a first one-time password (OTP) generating module configured to provide identification information regarding each of a plurality of pieces of OTP data to a user, and output an OTP provided according to any one identification information selected by the user; and
    a second OTP generating module based on mobile trusted module (MTM) configured to transfer the identification information regarding each of the plurality of pieces of OTP data to the first OTP generating module according to a corresponding request from the first OTP generating module, generate an OTP by using OTP data corresponding to the selected identification information, and transfer the generated OTP to the first OTP generating module;
    wherein the first OTP generating module comprises:
    an OTP information providing unit configured to request a plurality of pieces of OTP data retained in the mobile terminal from the second OTP generating module, and provide identification information regarding each of the plurality of pieces of OTP data received from the second OTP generating module;
    an OTP generation data transmitting unit configured to transmit the selected identification information and an input parameter for OTP generation to the second OTP generating module; and
    an OTP output unit configured to receive the OTP generated by the second OTP generating module and output the received OTP; and
    wherein the second OTP generating module comprises:
    an OTP calculating unit configured to perform a calculation operation to generate an OTP;
    an OTP storage unit configured to store a plurality of pieces of OTP data and identification information regarding each of the plurality of pieces of OTP data; and
    an OTP control unit configured to control the OTP calculating unit to perform calculation by using a specific cryptographic engine on the basis of the selected identification information received from the first OTP generating module.

2. The mobile terminal of claim 1, wherein the first OTP generating module and the second OTP generating module are independently configured on the basis of separate hardware.

3. The mobile terminal of claim 1, wherein the OTP calculating unit includes a plurality of cryptographic engines for processing a plurality of cipher algorithms, and performs a calculation operation to generate the OTP by using the specific cryptographic engine according to the selected identification information.

4. The mobile terminal of claim 1, wherein the OTP calculating unit performs a calculation operation to generate the OTP by using the input parameter received from the first OTP generating module and OTP data corresponding to the specific identification information.

5. The mobile terminal of claim 1, wherein the second OTP generating module is configured within an MTM.

6. The mobile terminal of claim 1, wherein each of the plurality of pieces of OTP data is seed information used as a basic input value for generating an OTP and user-specific information, and is registered as the same value in an authentication server from which authentication is to be requested using an OTP, in advance.

7. The mobile terminal of claim 1, wherein the identification information includes identifiable information with respect to the plurality of pieces of OTP data, is stored together with the OTP data, and includes at least one of application information, identification (ID) information, and information regarding a used cryptographic engine.

8. A method for generating a one-time password (OTP) by a first OTP generating module and a mobile trusted module (MTM) based second OTP generating module of a mobile terminal, the method comprising:
    transmitting, by the second OTP generating module, identification information regarding each of a plurality of pieces of OTP data to the first OTP generating module,
    providing, by the first OTP generating module, the identification information regarding each of a plurality of pieces of OTP data to a user;
    transmitting, by the first OTP generating module, any one identification information selected by the user and time information to the second OTP generating module;
    receiving, by the second OTP generating module, the identification information selected by the user and the time information from the first OTP generating module;
    performing a calculation, by the second OTP generating module, to generate an OTP by using OTP data corresponding to the selected identification information and the time information;
    providing, by the second OTP generating module, an OTP generated according to the calculation result to the first OTP generating module; and
    receiving, by the first OTP generating module, the OTP generated by the second OTP generating module and outputting the received OTP;
    wherein the identification information includes identifiable information with respect to the plurality of pieces of OTP data, is stored together with the OTP data, and includes at least one of application information, identification (ID) information, and information regarding a used cryptographic engine,
    wherein the performing the calculation includes performing a calculation operation for generating the OTP by using a specific cryptographic engine according to the selected identification information among a plurality of cryptographic engines for providing a plurality of cipher algorithms.

9. The method of claim 8, wherein the second OTP generating module is independently configured on the basis of hardware separately from the first OTP generating module.

10. The method of claim 8, wherein each of the plurality of pieces of OTP data is seed information used as a basic input value for generating an OTP and user-specific information, and is registered as the same value in an authentication server from which authentication is to be requested using an OTP, in advance.

11. The method of claim 8, wherein the transmitting comprises:
    receiving a request for transmission of a plurality of pieces of OTP data retained in the mobile terminal from the first OTP generating module; and transmitting identification information corresponding to each of the plurality of pieces of OTP data to the first OTP generating module.

* * * * *